(12) United States Patent
Chedore et al.

(10) Patent No.: US 10,237,633 B2
(45) Date of Patent: Mar. 19, 2019

(54) SYSTEMS AND METHODS FOR MODULAR DEPLOYMENT AND UPGRADE OF MULTIPLE OPTICAL SPECTRUM BANDS IN OPTICAL TRANSMISSION SYSTEMS

(71) Applicant: Ciena Corporation, Hanover, MD (US)

(72) Inventors: Paul Chedore, Ottawa (CA); Jean-Luc Archambault, Ottawa (CA); Balakrishnan Sridhar, Ellicott City, MD (US)

(73) Assignee: Ciena Corporation, Hanover, MD (US)

( * ) Notice: Subject to any disclaimer, the term of this patent is extended or adjusted under 35 U.S.C. 154(b) by 157 days.

(21) Appl. No.: 15/434,145

(22) Filed: Feb. 16, 2017

(65) Prior Publication Data

US 2018/0234749 A1 Aug. 16, 2018

(51) Int. Cl.
*H04J 14/02* (2006.01)
*H04Q 11/00* (2006.01)

(52) U.S. Cl.
CPC ...... *H04Q 11/0005* (2013.01); *H04J 14/0212* (2013.01); *H04J 14/0213* (2013.01); *H04Q 2213/13199* (2013.01); *H04Q 2213/13341* (2013.01)

(58) Field of Classification Search
CPC .......... H04B 10/27; H04J 14/0212; H04Q 2011/0016; H04Q 2213/13199; H04Q 2213/13341; H04Q 11/0005
USPC .......................................................... 398/48
See application file for complete search history.

(56) References Cited

U.S. PATENT DOCUMENTS

| 5,778,118 | A | 7/1998 | Sridhar |
| 5,963,361 | A | 10/1999 | Taylor et al. |
| 6,049,413 | A | 4/2000 | Taylor et al. |
| 6,057,959 | A | 5/2000 | Taylor et al. |
| 6,061,171 | A | 5/2000 | Taylor et al. |
| 6,178,038 | B1 | 1/2001 | Taylor et al. |
| 6,204,958 | B1 | 3/2001 | Taylor et al. |
| 6,407,863 | B1 | 6/2002 | Archambault et al. |
| 6,525,870 | B1 | 2/2003 | Cho et al. |

(Continued)

OTHER PUBLICATIONS

Wen-Cai et al; a selective C and L-Band Amplfied Spontaneous Emission source using a 1×2 Optical switch; IOP publishing Ltd; (Year: 2005).*

*Primary Examiner* — Amritbir K Sandhu
(74) *Attorney, Agent, or Firm* — Clements Bernard Walker PLLC; Christopher L. Bernard; Lawrence A. Baratta, Jr.

(57) ABSTRACT

An optical node supporting a modular deployment and upgrade of optical spectrum includes one or more C+L-Band amplifier modules; and a modular base module configured to interface one or more C-Band optical modems; wherein, in an initial deployment configuration, the modular base module provides channelized Amplified Spontaneous Emission (ASE) loading for select channels in the C-Band via a first ASE noise source coupled to a multiplexer for the C-Band, bulk ASE loading over the L-Band via a second ASE noise source coupled to an L-Band output, and an upgrade port for connection to an L-Band upgrade module. The L-Band upgrade module can selectively connect to the upgrade port to provide an L-Band upgrade configuration where the L-Band upgrade module and the modular base module coordinate transition of the bulk ASE loading to L-Band channelized ASE loading via a third ASE noise source.

20 Claims, 6 Drawing Sheets

(56) References Cited

U.S. PATENT DOCUMENTS

| | | |
|---|---|---|
| 6,559,985 B1 | 5/2003 | DeGrange, Jr. et al. |
| 6,765,659 B1 | 7/2004 | Bhatnagar et al. |
| 6,900,931 B1 | 5/2005 | Sridhar et al. |
| 7,054,562 B1 | 5/2006 | Balakrishnan et al. |
| 7,075,711 B2 | 7/2006 | Haggans et al. |
| 7,231,107 B1 | 6/2007 | Zhong et al. |
| 7,369,300 B2 | 5/2008 | Sridhar et al. |
| 7,400,443 B1 | 7/2008 | Sridhar et al. |
| 7,826,748 B2 | 11/2010 | Yang et al. |
| 8,295,703 B2 * | 10/2012 | Miura ............... H04B 10/25133 398/45 |
| 8,873,135 B2 | 10/2014 | Sridhar et al. |
| 8,885,248 B2 | 11/2014 | Bao et al. |
| 9,419,708 B2 | 8/2016 | Rad et al. |
| 9,831,947 B2 * | 11/2017 | Boertjes ............ H04B 10/07953 |
| 2002/0105694 A1 | 8/2002 | DeGrange, Jr. et al. |
| 2002/0105695 A1 | 8/2002 | DeGrange, Jr. et al. |
| 2002/0145780 A1 * | 10/2002 | Frigo .................... H04J 14/02 398/79 |
| 2002/0186459 A1 | 12/2002 | DeGrange, Jr. et al. |
| 2003/0025990 A1 | 2/2003 | DeGrange, Jr. et al. |
| 2006/0139742 A1 | 6/2006 | Frankel et al. |
| 2009/0232497 A1 | 9/2009 | Archambault et al. |
| 2011/0262142 A1 | 10/2011 | Archambault |
| 2012/0087658 A1 * | 4/2012 | Jander .................... H04J 14/02 398/48 |
| 2013/0045006 A1 * | 2/2013 | Dahan ................ H04J 14/0257 398/34 |
| 2013/0058647 A1 * | 3/2013 | Boertjes ............ H04B 10/0775 398/38 |
| 2014/0077971 A1 | 3/2014 | Archambault et al. |
| 2014/0348501 A1 | 11/2014 | Bao et al. |
| 2016/0173202 A1 * | 6/2016 | Kelly .................. H04B 10/506 398/34 |
| 2016/0261344 A1 * | 9/2016 | Zhang ................ H04B 10/2543 |
| 2017/0310392 A1 * | 10/2017 | Boertjes ........... H04B 10/07953 |
| 2018/0083599 A1 * | 3/2018 | Kippenberg ......... H04B 10/506 |
| 2018/0234749 A1 * | 8/2018 | Chedore ............ H04Q 11/0005 |
| 2018/0262292 A1 * | 9/2018 | Dangui ............. H04B 10/2916 |

\* cited by examiner

SYSTEMS AND METHODS FOR MODULAR DEPLOYMENT AND UPGRADE OF MULTIPLE OPTICAL SPECTRUM BANDS IN OPTICAL TRANSMISSION SYSTEMS

FIELD OF THE DISCLOSURE

The present disclosure generally relates to optical networking systems and methods. More particularly, the present disclosure relates to systems and methods for modular deployment and upgrade of multiple optical spectrum bands (e.g., C and L bands) in optical transmission systems with coordinated Amplified Spontaneous Emission (ASE) loading.

BACKGROUND OF THE DISCLOSURE

Optical networks continue to grow as network usage continues to evolve. To date, optical networks utilize optical spectrum in the C-band (e.g., about 1527 nm to 1567 nm) with Erbium Doped Fiber Amplifiers (EDFAs). There have been plans and projections to extend the usage of optical spectrum to other bands such as the L-band (e.g., 1569 nm to 1611 nm), but such approaches have not been widely deployed. Conventional C+L band approaches (or planned approaches) treat each band as a separate entity. Initially, only C-Band hardware is deployed with the idea later that, when the optical spectrum in the C-Band is exhausted (either through use or channel block), the L-Band hardware would be added. Again, there are systems deployed with the ability to add the L-Band hardware, but this simply has not occurred for various reasons. As described herein, the C-Band hardware and the L-Band hardware can include multiplexing/demultiplexing components, amplifiers, Optical Channel Monitors (OCMs), and optical modems. One particular problem with later adding the L-Band hardware is a pronounced performance shift between existing C-Band channels as the new L-Band signals appear due to Stimulated Raman Scattering (SRS).

FIG. 1 illustrates a graph 10 of optical spectrum with only C-Band channels deployed compared with a graph 12 of the optical spectrum illustrating the effect of SRS as the L-Band channels are populated. As seen in the graphs 10, 12, there is a pronounced performance shift in existing C-Band channels as L-Band channels are populated. As a consequence, an optical system would need to adjust a number of operating parameters in order to rebalance the C-Band channels as the L-Band channels are populated. The C-Band channels also need to be engineered with enough margin at the beginning of life to absorb the eventual penalty associated with L-Band usage. Failing to do this properly could result in existing signals seeing traffic hits due to expansion in the L-Band. For Raman amplification, it is also very difficult to accurately calibrate Raman gain in the C-Band for the eventual effect of the L-Band channels and L-Band Raman amplification.

A conventional approach to addressing these limitations is noise loading where unfilled channels are replaced by noise, such as generated by an Amplified Spontaneous Emission (ASE) source. This approach is done within a single band, i.e., the C-Band, and has not been suggested between different bands, in a coordinated manner.

BRIEF SUMMARY OF THE DISCLOSURE

In an exemplary embodiment, an optical node supporting a modular deployment and upgrade of optical spectrum includes one or more C+L-Band amplifier modules; and a modular base module configured to interface one or more C-Band optical modems; wherein, in an initial deployment configuration, the modular base module provides channelized Amplified Spontaneous Emission (ASE) loading for select channels in the C-Band via a first ASE noise source coupled to a multiplexer for the C-Band, bulk ASE loading over the L-Band via a second ASE noise source coupled to an L-Band output, and an upgrade port for connection to an L-Band upgrade module. The optical node can further include the L-Band upgrade module which selectively connects to the upgrade port to provide an L-Band upgrade configuration, wherein, from the initial deployment configuration to the L-Band upgrade configuration, the L-Band upgrade module and the modular base module coordinate transition of the bulk ASE loading to L-Band channelized ASE loading via a third ASE noise source. The transition can include the bulk ASE loading being turned down while the L-Band channelized ASE loading is turned up.

In the initial deployment configuration, both the C-Band and the L-Band can be noise loaded without requiring channel components for the L-Band. The L-Band upgrade module can be selectively insertable in the modular base module for L-Band upgrade configuration. The one or more C+L-Band amplifier modules can include Raman amplifiers, and wherein, in the initial deployment configuration, Raman gain of the Raman amplifiers is calibrated for both the C-Band and the L-Band. To upgrade from the initial deployment configuration, the L-Band upgrade module is connected to the upgrade port, the bulk ASE loading is turned down as L-Band channelized ASE loading is added via a third ASE noise source, and one or more L-Band channels are added as corresponding L-Band channelized ASE loading is turned down. The first ASE noise source and the second ASE noise source each can include a flattened Erbium Doped Fiber Amplifier (EDFA) with no input and each are disposed in the modular base module. The channelized ASE loading can be performed based on channel monitoring and by coupling a portion of the first ASE source based thereon and the bulk ASE loading is provided at a single interface.

In another exemplary embodiment, an optical system supporting a modular deployment and upgrade of optical spectrum includes C-Band ingress ports; a C-Band demultiplexer and a C-Band multiplexer coupled to the C-Band ingress ports; a C-Band egress port coupled to the C-Band demultiplexer and the C-Band multiplexer; a first Amplified Spontaneous Emission (ASE) source coupled to the C-Band multiplexer and configured to provide channelized ASE loading for one or more C-Band channels via the C-Band multiplexer; an upgrade port and an L-Band egress port; and a second ASE source coupled between the L-Band egress port and the upgrade port and configured to provide bulk ASE loading for all of the L-Band. The optical system can further include one or more C+L-Band amplifier modules, wherein the one or more C+L-Band amplifier modules can include Raman amplifiers, and wherein, in an initial deployment configuration, Raman gain of the Raman amplifiers is calibrated for both the C-Band and the L-Band. The second ASE source can provide noise loading of the L-Band without requiring channel components for the L-Band.

The optical system can further include an L-Band upgrade module including L-Band ingress ports; an L-Band demultiplexer and an L-Band multiplexer coupled to the L-Band ingress ports; an L-Band egress port coupled to the L-Band demultiplexer and the L-Band multiplexer, and the L-Band egress port further selectively coupled to the upgrade port;

and a third ASE source coupled to the L-Band multiplexer and configured to provide L-Band channelized ASE loading via the L-Band multiplexer, wherein the second ASE source and the third ASE source perform a coordinated handoff to switch from the bulk ASE loading to the L-Band channelized ASE loading. In an initial deployment configuration, the second ASE source can provide the bulk ASE loading without the L-Band upgrade module equipped, and in a transition to an L-Band upgrade, the L-Band upgrade module can be equipped, and the bulk ASE loading can be turned down as the L-Band channelized ASE loading is added. The first ASE source, the second ASE source, and the third ASE source each can include a flattened Erbium Doped Fiber Amplifier (EDFA) with no input and each are disposed in the modular base module. The channelized ASE loading and the L-Band channelized ASE can be performed based on channel monitoring and by coupling a portion of the respective ASE source based thereon and the bulk ASE loading is provided at a single interface. The C-Band ingress ports, the C-Band demultiplexer, the C-Band multiplexer, the first ASE source, the upgrade port, the L-Band egress port, and the second ASE source can be associated with a base module, and the L-Band ingress ports, the L-Band demultiplexer, the L-Band multiplexer, the L-Band egress port, and the third ASE source can be associated with an upgrade module.

In a further exemplary embodiment, a method for modular deployment and upgrade of optical spectrum in an optical node includes providing channelized Amplified Spontaneous Emission (ASE) loading in a C-Band of optical spectrum; providing bulk ASE loading in an L-Band of the optical spectrum in an initial deployment configuration; and providing an L-Band upgrade port capable of connecting to an L-Band upgrade with L-Band channelized ASE loading that operates concurrently with the bulk ASE loading during an upgrade process. The method can further include, in the initial deployment configuration, calibrating Raman gain for both the C-Band and the L-Band with the channelized ASE loading and the bulk ASE loading; and determining Optical Signal-to-Noise Ratio (OSNR) and power margin during the initial deployment configuration for an end-of-life and fullfill condition. The method can further include subsequent to the initial deployment configuration for the upgrade process, providing L-Band channelized ASE loading while turning down the bulk ASE loading; and adding one or more L-Band channels in the L-Band by removing corresponding L-Band channelized ASE loading and adding the one or more L-Band channels.

In a further exemplary embodiment, an optical module supporting modular deployment and upgrade of optical spectrum in an optical node includes a Wavelength Selective Switch (WSS) comprising a plurality of ports; and an Amplified Spontaneous Emission (ASE) noise source coupled to an add port of the WSS; wherein the WSS is configured to provide channelized ASE loading from the ASE noise source for unequipped channels. The ASE noise source can be a first ASE noise source, and the optical module can further include a second ASE noise source coupled to an upgrade port to provide bulk ASE loading. The channelized ASE loading can be provided in the C-Band and the bulk ASE loading is provided in the L-Band prior to equipping channels in the L-Band.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, in various exemplary embodiments, the present disclosure relates to systems and methods for modular deployment and upgrade of multiple optical spectrum bands (e.g., C and L bands) in optical transmission systems with coordinated Amplified Spontaneous Emission (ASE) loading. As capacity continues to increase and unlit fibers become used, it is expected that service providers will need a mechanism to exploit their fiber assets more efficiently. As leasing or laying new fiber is cost prohibitive, utilizing both the C-Band and the L-Band provides an effective approach to double fiber capacity. As mentioned herein, deploying channels and amplification across both the C-Band and the L-Band together present additional control challenges, especially in a staged deployment where the C-Band is deployed first, and the L-Band is added as an upgrade. To address the aforementioned limitations and the control challenges, the systems and methods utilize coordinated ASE noise loading across both the C-Band and the L-Band in an initial deployment, without initially requiring a full set of L-Band hardware. This results in simplified control, network planning, and real-time link engineering; accurate calibration of Raman amplifiers across both bands prior to turning the system up; and improved service restoration times. In an exemplary embodiment, the modular deployment and upgrade is through a modular hardware design in a Reconfigurable Optical Add/Drop Multiplexer (ROADM) or the like which defers the cost of L-Band hardware such as multiplexing/demultiplexing components (e.g., a Wavelength Selective Switch (WSS) or the like), OCMs, and the like. As noted herein, the concept of ASE loading conventionally is constrained to a single band, i.e., the C-Band. The systems and methods provide a coordinated approach that covers the L-Band in the initial deployment where no L-Band channels are deployed and a handoff technique which allows noise loading to shift from the initial deployment when L-Band channels are deployed.

Optical Node

Figure 2:
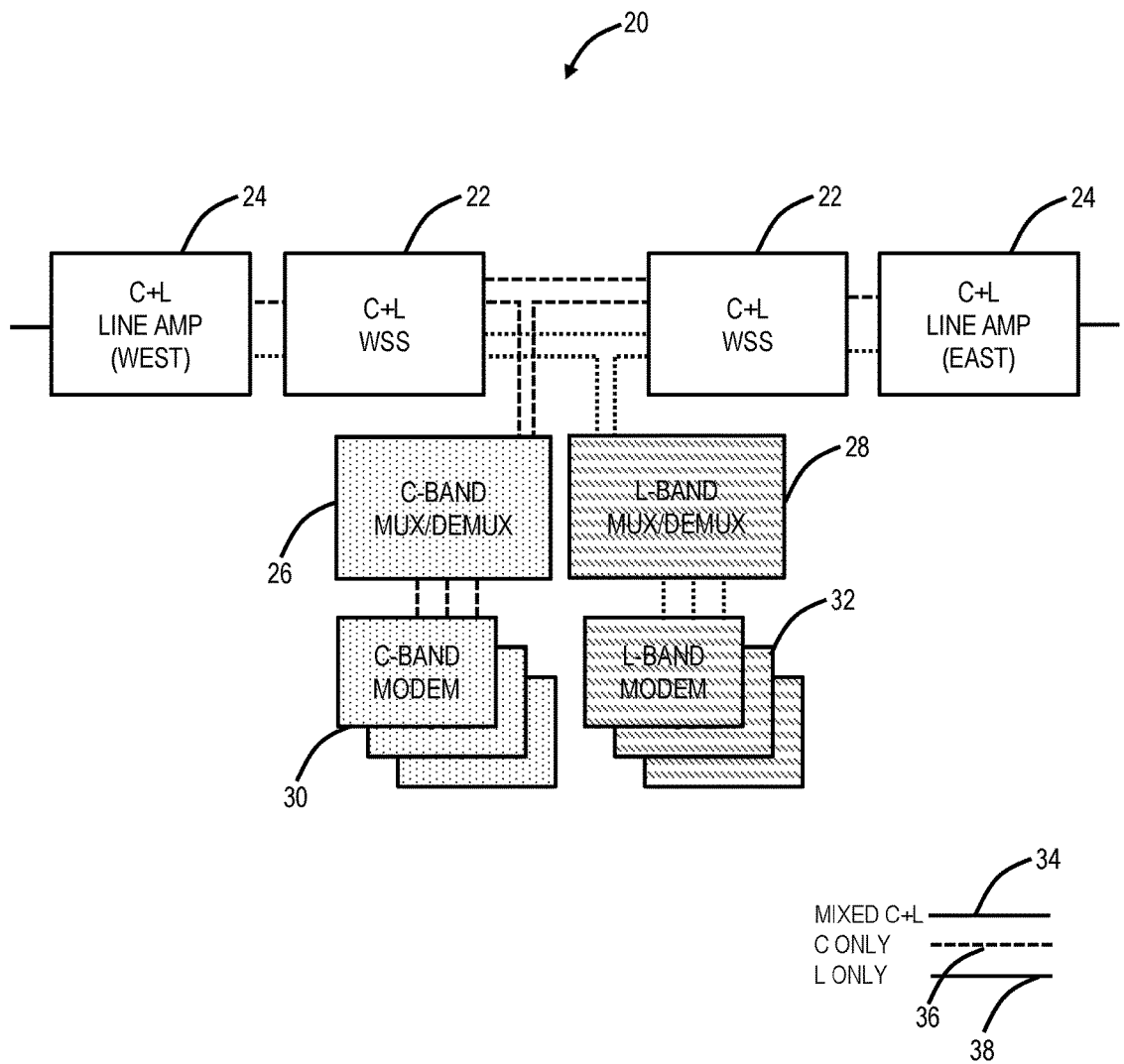
FIG. 2 is a block diagram of an exemplary optical node for describing the coordinated ASE loading between the C-Band and the L-Band.

Referring to FIG. 2, in an exemplary embodiment, a block diagram illustrates an exemplary optical node 20 for describing the coordinated ASE loading between the C-Band and the L-Band. The optical node 20 can be a ROADM, OADM, or the like. In this example, the optical node 20 is shown in a two-degree configuration, i.e., facing East and West. Of course, other embodiments are also contemplated with the optical node 20 shown for illustration purposes. Also, the various components in FIG. 2 are shown in separate boxes for illustration purposes, and these may be combined in any manner in actual hardware implementation with FIG. 2 providing a logical view. Further, the optical node 20 can be a ROADM in any configuration such as Colorless-Directionless-Contentionless (CDC), Colorless-Directionless (CD), Colorless, and Fixed.

The optical node 20 includes, for each degree, a C+L Band WSS 22 and a C+L Band amplifier 24. In this two-degree example, there are two C+L Band WSSs 22 and C+L Band amplifiers 24. In the modular hardware design, the initial deployment (C-Band only) can only require the C+L Band WSS 22 and a C+L Band amplifier 24. In another exemplary embodiment, the C+L Band WSS 22 can further only require C-Band WSS components with the L-Band WSS components added when needed. Further, in the modular hardware design, the optical node 20 includes a C-Band multiplexer/demultiplexer (mux/demux) 26, an L-Band mux/demux 28, C-Band modems 30, and L-Band modems 32. The C-Band mux/demux 26 and the L-Band mux/demux 28 are deployed based on the ROADM configuration, i.e., CDC, CD, Colorless, or Fixed. The C-Band mux/demux 26 is deployed in the initial configuration along with any of the C-Band modems 30 needed. The C-Band modems 30 are continually deployed until the C-Band spectrum is exhausted, either due to all channels being in use or through some other exhaustion such as blocking. Once the L-Band is needed, the L-Band mux/demux 28 is added along with the L-Band modems 32 as needed. Again, where the C+L Band WSS 22 is also modular, the associated L-Band equipment is added.

FIG. 2 also includes connection lines 34, 36, 38 between the various modules, i.e., optical cables. A connection line 34 indicates both the C-Band and L-Band channels are included, a connection line 36 indicates only C-Band channels are included, and a connection line 38 indicated only L-Band channels are included. These connection lines 36, 38 are cabled to add the new components in the modular upgrade from C-Band only initially to C-Band and L-Band.

ASE Loading

Figure 1:
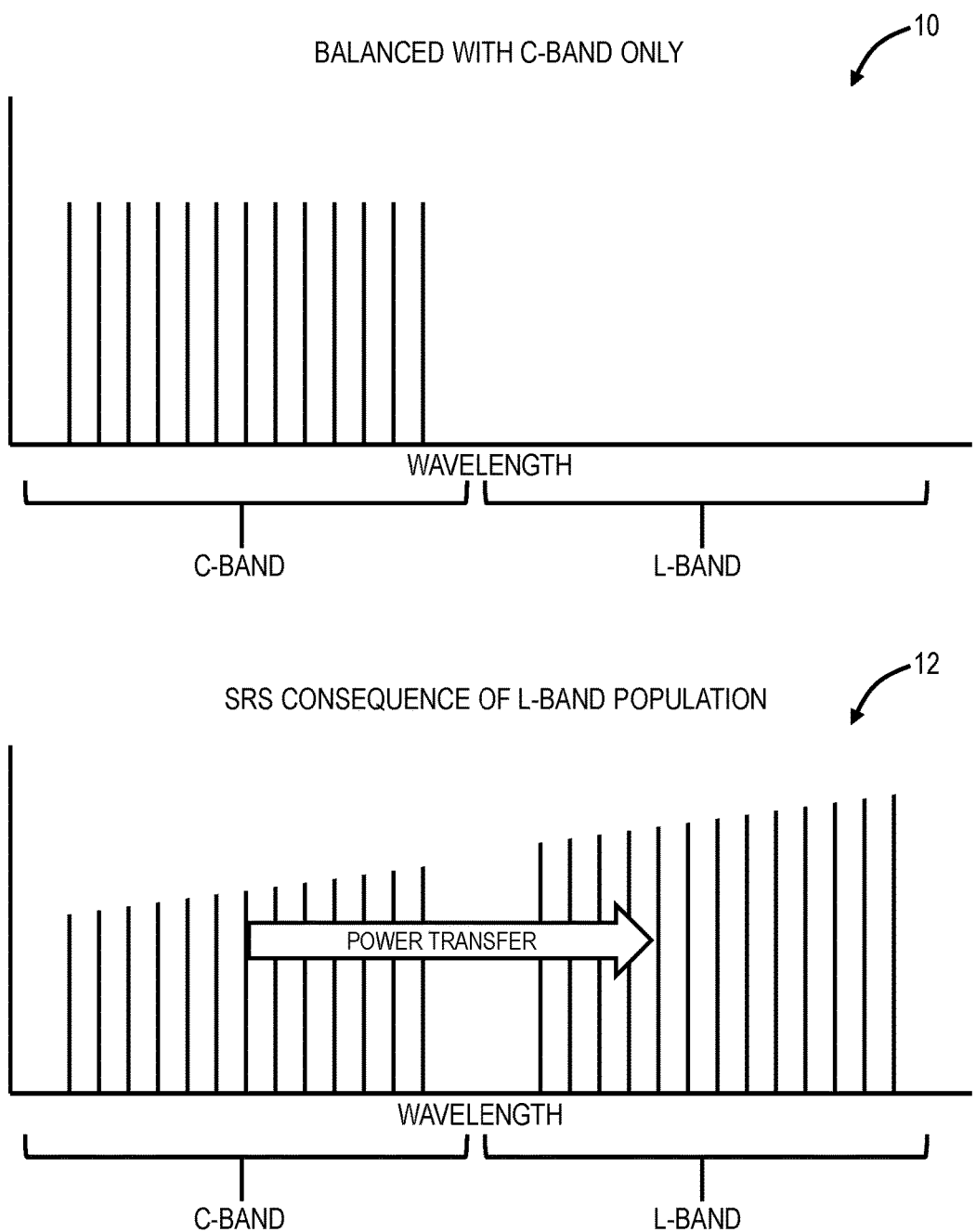
FIG. 1 is a graph of optical spectrum with only C-Band channels deployed compared with a graph of the optical spectrum illustrating the effect of Stimulated Raman Scattering (SRS) as the L-Band channels are populated.

The systems and methods support the modular deployment and upgrade of the C-Band and the L-Band with coordinated ASE loading between the bands. The underlying goal of ASE loading is to generate placeholder power for channels so that the system can be maintained in a stable, full-fill operating state. As channels are added throughout the systems life, the placeholder ASE in a similar amount of spectrum is removed. The ASE power can be generated using a flattened EDFA with no input. This EDFA needs to create a similar power spectral density as the channels it intends to replace. The primary benefit of ASE loading is that it prompts the effects of SRS. This phenomenon also exists in the C-Band, but it is more pronounced in systems spanning both the C-Band and the L-Band. As signals propagate in fiber power is transferred from lower wavelengths to higher wavelengths (see FIG. 1). The presence of power in the L-Band, initially while no channels are deployed, allows the system to adjust itself for this effect day one thus suffering no change as a result of channel expansion into the L-Band.

The coordinated ASE loading provides a simplified control, planning, and real-time link engineering benefit. In the absence of L-Band noise, system modeling and network planning must ensure sufficient Optical Signal-to-Noise Ratio (OSNR) and power margin for the channel to function correctly in an end-of-life and full-fill condition. The performance shifts due to SRS, Power Dependent Tilt (PDT), and OSNR exacerbate the computational challenge of real-time link engineering and viability calculations. Thus, a noise loaded C-Band and L-Band allow for control simplification and improves the responsiveness in flexible spectrum type scenarios, i.e., where the optical modems 30, 32 are programmable from a modulation format and baud rate perspective and can adjust to consume excess margin. Additionally, for service providers who intend to assume some level of optical layer control the predictable performance is very attractive.

For Raman amplifier calibration, the presence of ASE in both bands at the time of system turn up allows for C-Band Raman calibration to factor in the effect L-Band Raman and channels will have on C-Band gain. Without this, the Raman gain cannot be calibrated to operate with the same level of accuracy later in the system's life when the L-Band channels are deployed. Presently, the system must be out of service in order to calibrate Raman gain accurately.

For a fast restoration benefit, the presence of channelized noise enables WSS control loops to converge in a state that allows for fast restoration times. Without this placeholder power, each WSS in the ROADM cascade goes through a channel add sequence before the downstream WSS can, in turn, do the same. This makes restoration times considerably slower.

Modular Hardware Design with Coordinated ASE Loading

Figure 3:
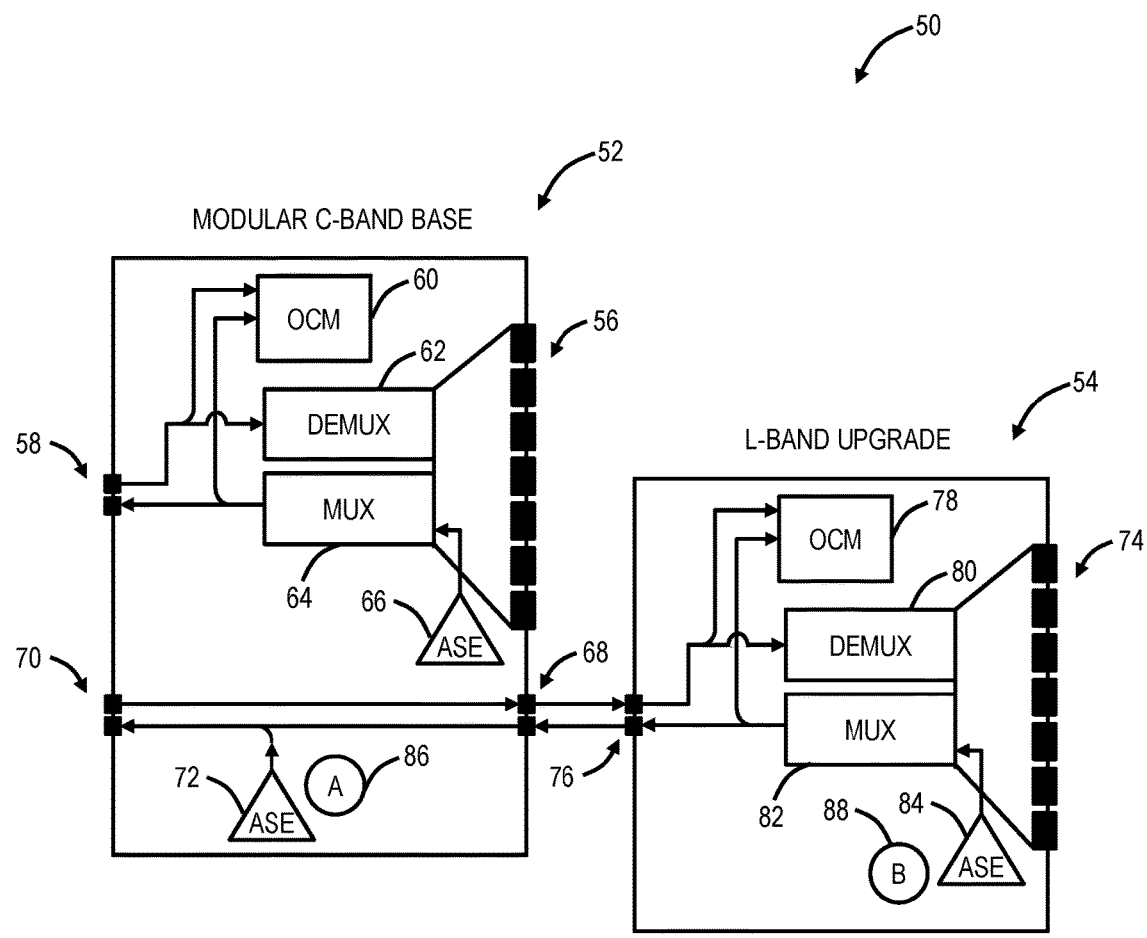
FIG. 3 is a block diagram of a modular configuration with a modular C-Band base and an L-Band upgrade for supporting the modular deployment and upgrade and coordinated ASE loading.

Referring to FIG. 3, in an exemplary embodiment, a block diagram illustrates a modular configuration 50 with a modular C-Band base 52 and an L-Band upgrade 54 for supporting the modular deployment and upgrade and coordinated ASE loading. The modular C-Band base 52 and the L-Band upgrade 54 can be realized as modules, plugs, line cards, plugins, etc. which are physically deployed in the optical node 20. Those skilled in the art will recognize any hardware form factor is contemplated. The modular C-Band base 52 is deployed initially with a C-Band only deployment and the L-Band upgrade 54 is deployed as the first L-Band channel is needed. However, the modular C-Band base 52 and the L-Band upgrade support coordinated ASE loading as described herein.

The modular C-Band base 52 includes ingress ports 56 coupled to respective C-Band modems 22 (not shown), and a C-Band egress port 58 coupled to a C-Band amplifier port (not shown). Note, both of the ports 56, 58 are bidirectional optical connections. The modular C-Band base 52 further includes an OCM 60, a demux 62, and a mux 64, each of which operates on C-Band channels. The OCM 60 is a per channel power monitor and can receive a tap off of an input to the demux 62 from the port 58 and off of an output of the mux 64 to the port 58. The demux 62 and mux 64 can be wavelength selective components, such as a WSS or the like. The demux 62 can receive combined channels from the port 58 and provide individual channels to the ports 56 whereas the mux 64 can receive individual channels from the ports 56 and provide a single combined output to the port 58.

The modular C-Band base 52 further includes an ASE noise source 66 which can be coupled to the mux 64. In an exemplary embodiment, the ASE noise source 66 can be a flattened EDFA with no input. The mux 64 can direct output from the ASE noise source 66 as required to any C-Band channel it intends to replace, based on monitoring from the OCM 60. That is, the modular C-Band base 52 supports channelized ASE where individual C-Band channels which are not present can be replaced with the channelized ASE directed by the mux 64 from the ASE noise source 66 and based on the OCM 60. That is, the mux 64, i.e., a WSS, creates channelized ASE noise based on feedback from the OCM 60. In this manner, the OCM 60, the mux 62, and the ASE noise source 66 create a similar power spectral density as the C-Band channels it intends to replace.

In order to support L-Band channelized ASE in the initial configuration, the optical node 20 would require corresponding mux, demux, and OCM components for the L-Band. This is less than ideal since these components are costly eliminating the value of a modular upgrade, i.e., L-Band would need to be fully equipped day one. However, in the conventional approach, the lack of L-Band components prevents the use and benefit of ASE noise loading.

Figure 5:
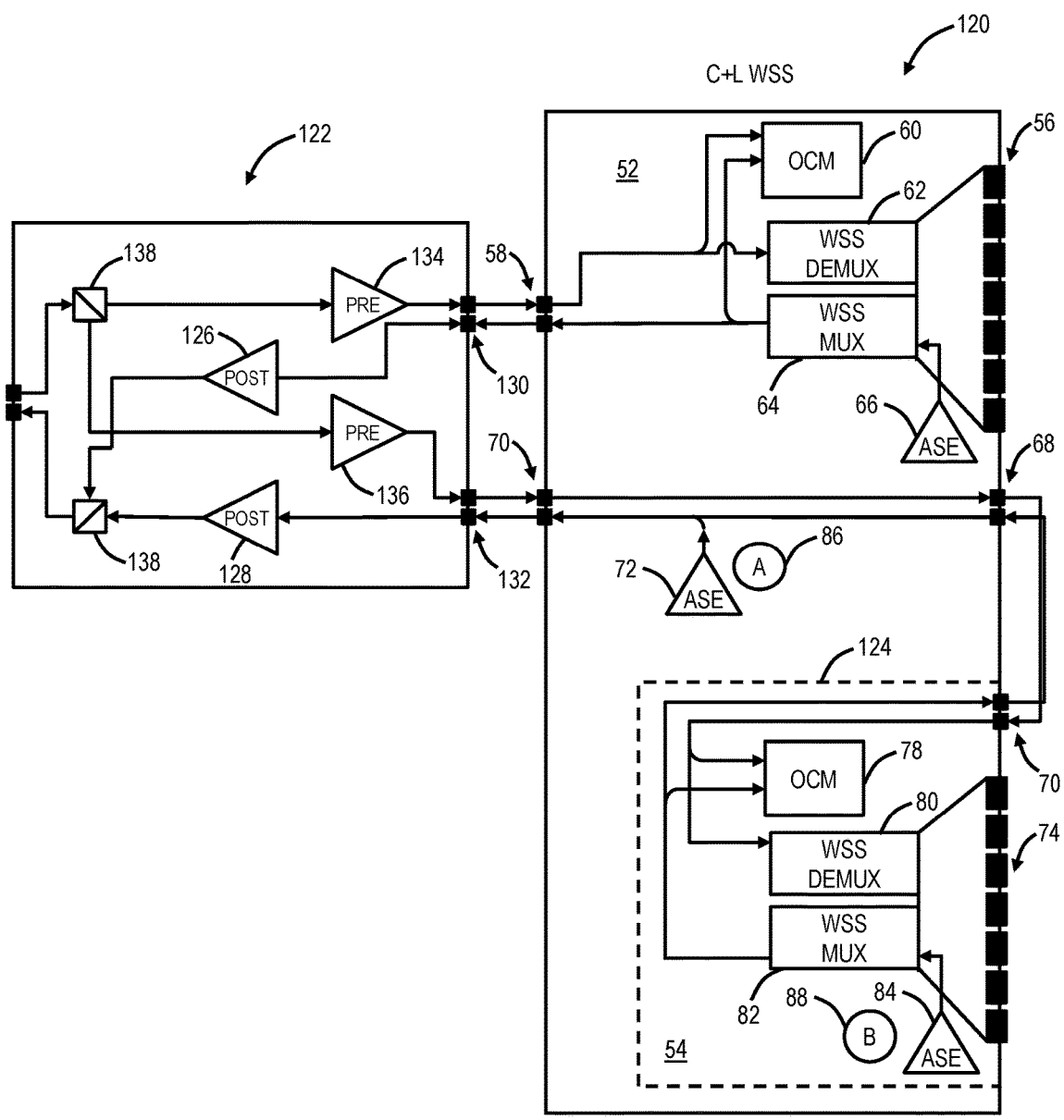
FIG. 5 is a block diagram of a C+L WSS module and a C+L amplifier module which can support the modular deployment and upgrade and coordinated ASE loading.

The systems and methods provide a coordinated ASE approach between the C-Band and the L-Band and a modular upgrade mechanism. Specifically, the modular C-Band base 52 further includes an upgrade port 68 which are coupled to the L-Band upgrade 54 when deployed (after the initial configuration) and an egress port 70 coupled to an L-Band amplifier port (not shown). Note, the line amplifiers are omitted in FIG. 3 (an example of a line amplifier is illustrated in FIG. 5), but both the C-Band amplifiers and the L-Band amplifiers would be deployed in the initial configuration. Further, the C-Band amplifiers and the L-Band amplifiers could include EDFA amplifiers, Raman amplifiers, and a combination thereof.

In the initial configuration (the modular C-Band base 52 with the L-Band upgrade omitted), the upgrade port 68 is unconnected. However, the modular C-Band base 52 supports L-Band ASE loading through an ASE noise source 72 which can be similar to the ASE noise source 66. The ASE noise source 72 does not provide channelized ASE, but rather bulk ASE. Here in the bulk ASE, there is no requirement to use an OCM and mux to determine a specific amount of ASE as in channelized ASE. Rather, the ASE noise source 72 is directly connected to an output line which connects to the egress port 70 providing the bulk ASE to the L-Band amplifier. The control of the bulk ASE is simplified—only a single value is required for loading the entire L-Band.

The separation of the modular C-Band base 52 from the L-Band upgrade 54 provides an opportunity to defer the costs of the costly L-Band WSS and OCM. As described herein, these components are only required when the optical node 20 would begin adding channels to the L-Band once the C-Band was exhausted, blocked, etc. The approach here allows broadband ASE to load the L-Band in bulk while the C-Band is being deployed.

The L-Band upgrade 54 ingress ports 74 coupled to respective L-Band modems 28 (not shown) and L-Band egress port 76 which are coupled to the upgrade port 68 on the modular C-Band base 52. Similarly, both of the ports 74, 76 are bidirectional optical connections. The L-Band upgrade 54 further includes an OCM 78, a demux 80, and a mux 82, each of which operates on L-Band channels and these components have similar functionality as their counterparts in the modular C-Band base 52. Further, the L-Band upgrade 54 includes an ASE noise source 84 which can be coupled to the mux 82 and the ASE noise source 84 can operate in a similar manner as the ASE noise source 66 to provide channelized ASE to the L-Band channels.

Thus, in the initial configuration with just the modular C-Band base 52, ASE noise loading includes channelized ASE loading in the C-Band via the ASE noise source 66, i.e., where C-Band channels are not present, and bulk ASE loading in the L-Band via the ASE noise source 72 (denoted as step (A) 86 in FIG. 3). At some point after the initial configuration when the L-Band upgrade 54 is provided, there is a noise loading handoff between the ASE noise source 72 providing bulk ASE loading and the ASE noise source 84 providing channelized ASE loading in the L-Band (denoted as step (B) 88 in FIG. 3). Using photodetectors such as through the OCM 78 as feedback, power is transitioned between the two sources 72, 84 such that the SRS impact on existing C-Band channels is insignificant (i.e., does not impact existing traffic and any performance degradations are minor).

Coordinated ASE Loading Example

Figure 4:
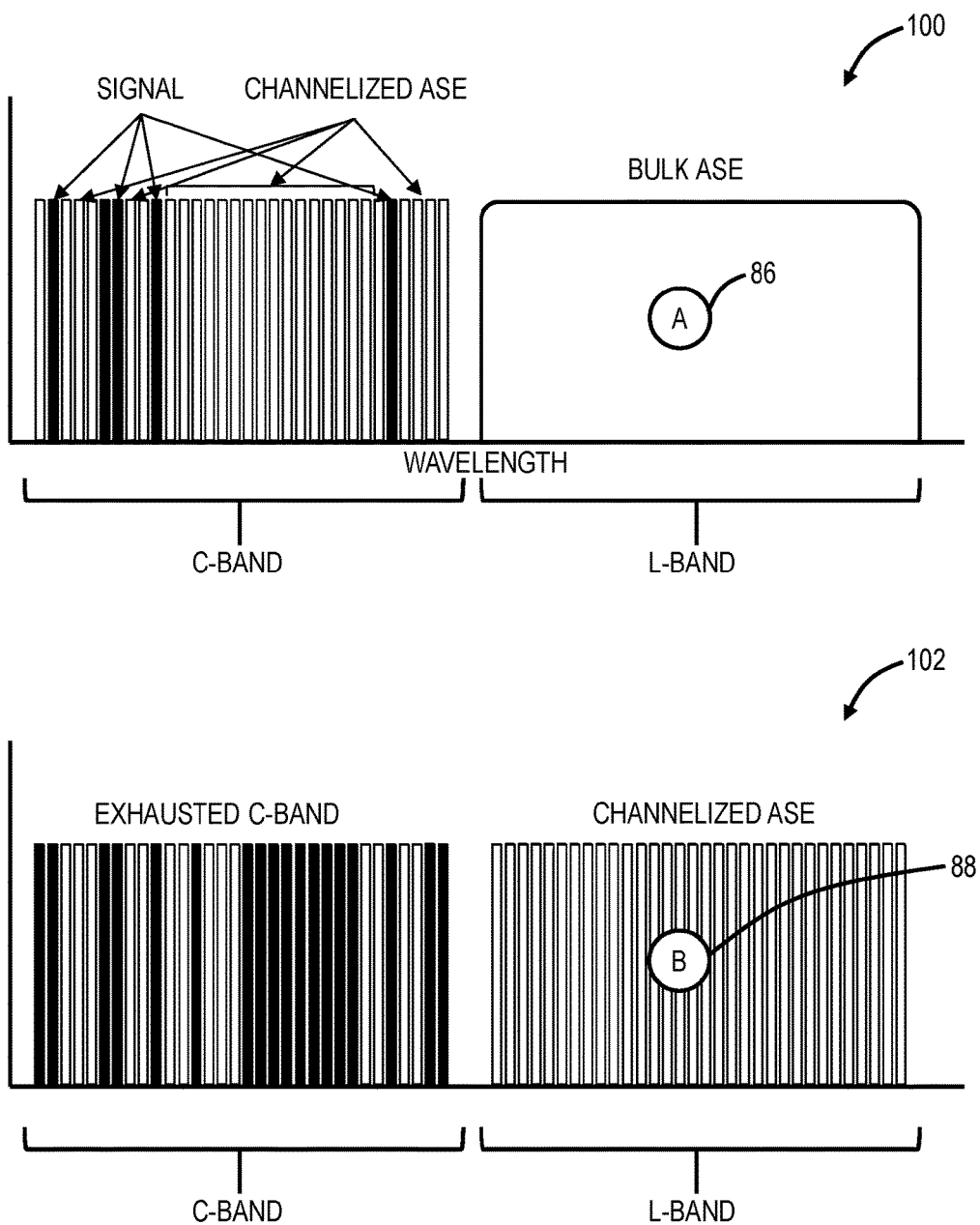
FIG. 4 is a graph of an initial configuration with the C-Band equipped with C-Band channels and channelized ASE loading and with the L-Band equipped with bulk ASE loading and a graph of an upgrade configuration with the C-Band exhausted and the L-Band transitioned from the bulk ASE loading to channelized ASE loading.

Referring to FIG. 4, in an exemplary embodiment, a graph 100 illustrates an initial configuration with the C-Band equipped with C-Band channels and channelized ASE loading and with the L-Band equipped with bulk ASE loading and a graph 102 illustrates an upgrade configuration with the C-Band exhausted and the L-Band transitioned from the bulk ASE loading to channelized ASE loading. Specifically, in the initial configuration, there are a few exemplary C-Band channels illustrated and the remaining C-Band channels are replaced with channelized ASE loading, and the L-Band is filled entirely with the bulk ASE loading (step (A) 86). In the upgrade configuration, there is much more exemplary C-Band channels and less channelized ASE loading. However, the L-Band may be needed because of blocking or contention in the C-Band or for any other reason. At this point, the bulk ASE loading (step (A) 86) is transitioned to the channelized ASE loading (step (B) 88) as the L-Band upgrade 54 contains the associated hardware components to support the channelized ASE loading. At this point, the ASE noise source 72 in the modular C-Band base 52 can be disabled.

Module Configuration

Referring to FIG. 5, in an exemplary embodiment, a block diagram illustrates a C+L WSS module 120 and a C+L amplifier module 122 which can support the modular deployment and upgrade and coordinated ASE loading. FIG. 5 illustrates one exemplary approach to physical modules for the modular C-Band base 52 and the L-Band upgrade 54. Here, the C+L WSS module 120 can house the components in the modular C-Band base 52, and the components in the L-Band upgrade 54 can be in a pluggable module 124 which can be selectively inserted into the C+L WSS module 120. Also, the C+L amplifier module 122 can include post amplifiers 126, 128 between the muxes 64, 82 and the ports 58, 70, respectively.

The C+L amplifier module 122 can include ports 130, 132 which connect to the ports 58, 70, respectively. The C+L amplifier module 122 includes C-Band amplifiers 126, 134 and L-Band amplifiers 128, 136. The C+L amplifier module 122 further includes C/L-Band splitters 138 which separate the C-Band and the L-Band. Note, one or more of the various components in the C+L amplifier module 122 could be in the C+L WSS module 120 instead of the C+L amplifier module 122. FIG. 5 is merely shown for illustration purposes.

Coordinated ASE Loading Process

Figure 6:
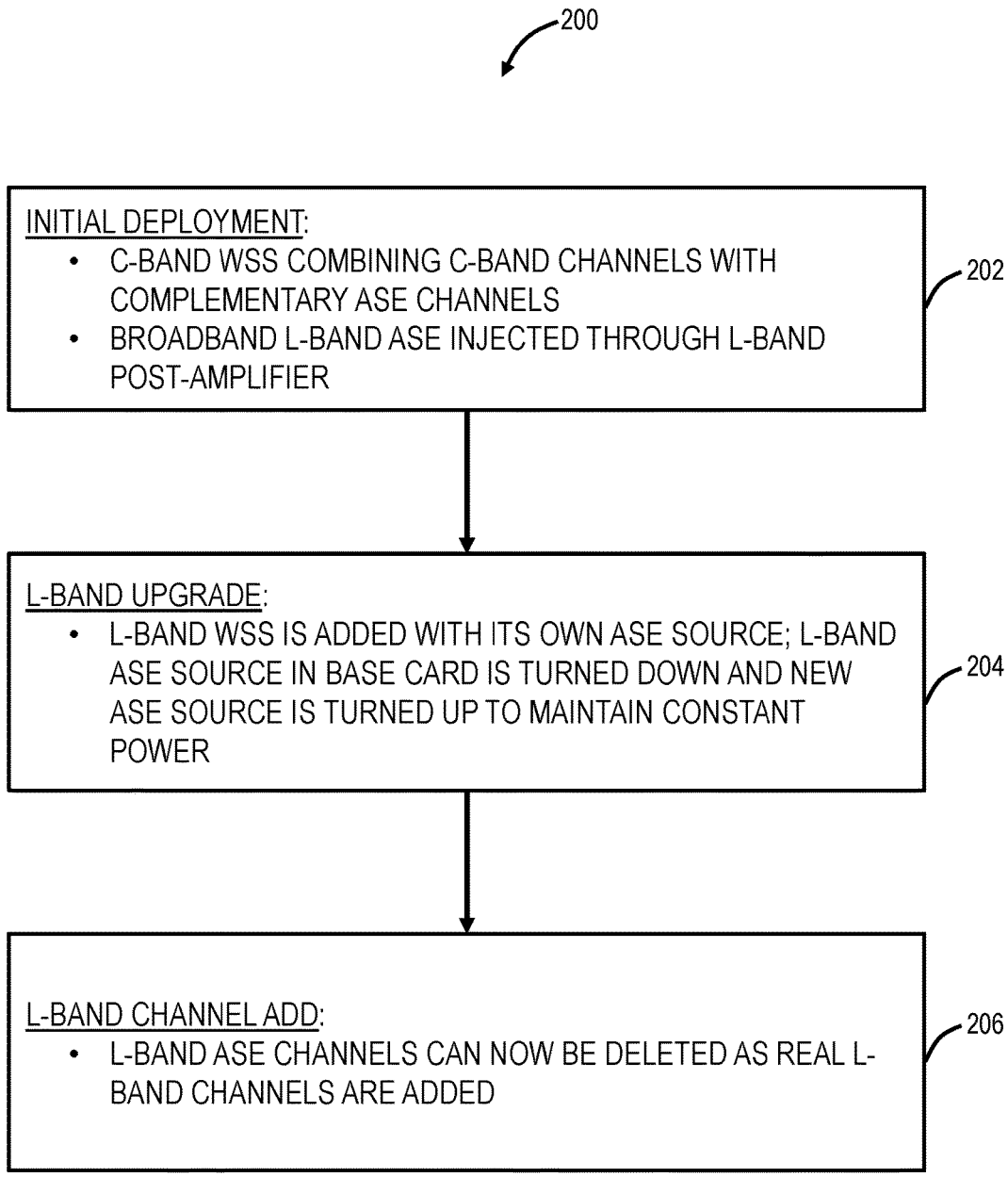
FIG. 6 is a flowchart of a coordinated ASE loading process supporting the modular deployment and upgrade from the C-Band to both the C-Band and the L-Band.

Referring to FIG. 6, in an exemplary embodiment, a flowchart illustrates a coordinated ASE loading process 200 supporting the modular deployment and upgrade from the C-Band to both the C-Band and the L-Band. In an initial deployment or configuration (step 202), the C-Band WSS combines C-Band channels with complementary ASE channels where the C-Band channels are unequipped to provide channelized ASE loading, and an L-Band broadband ASE noise source is injected through an L-Band post amplifier to provide bulk ASE loading. In an L-Band upgrade (step 204), the L-Band WSS is added with its own ASE noise source for channelized ASE loading in the L-Band, the L-Band broadband ASE noise source is turned down and the ASE noise source in the L-Band WSS is turned up concurrently to maintain constant power. The L-Band upgrade step 204 includes removal of the bulk ASE loading in place of channelized ASE loading for each L-Band channel. In this manner, the entire power of the bulk ASE loading can be replaced by a complementary amount of power from the channelized ASE loading. Once the L-Band upgrade step 204 is completed, L-Band channels can be added by deleting a corresponding ASE channel and adding the L-Band channel (step 206).

Advantageously, the coordinated ASE loading process 200 ensures that the optical node 20 maintains constant performance as channels are added/deleted, mitigates effects of SRS which are much more significant in the combined C+L-Band compared to C-Band only due to increased signal power and bandwidth, simplifies controls as the optical node 20 is in a constant state, enables fast restoration (e.g., less than 10 s), and can provide WSS isolation sufficient to eliminate a need for a blocker.

With respect to the actual upgrade from the bulk ASE loading to channelized ASE loading in the L-Band, this process is performed in a short time period (seconds to minutes) in a controlled manner to avoid performance degradation. This process must be done concurrently or simultaneously to avoid perturbing the existing C-Band channels. As noted in FIGS. 3 and 5, subsequent to connecting the L-Band upgrade 54, the ASE noise sources 72, 84 are both connected to the egress port 70 and able to simultaneously or concurrently provide ASE loading on the L-Band. In an exemplary embodiment, the power on the ASE noise source 72 can be turned down by a certain amount while the power on the ASE noise source 84 is turned up by about the same amount. For example, this could be a dB or a fraction of a dB. The power on the ASE noise source 72 can be turned down via a Variable Optical Attenuator (VOA) coupled thereto or by controlling the output. This process can continue until the ASE noise source 72 provides no more loading and can be disabled or turned off. In this manner, the upgrade keeps approximately even ASE loading in the L-Band while switching between the ASE noise sources 72, 84.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. An optical node supporting a modular deployment and upgrade of optical spectrum, the optical node comprising:
   one or more C+L-Band amplifier modules; and
   a modular base module including a plurality of ports and which is configured to interface one or more C-Band optical modems;
   wherein, in an initial deployment configuration, the modular base module includes
      channelized Amplified Spontaneous Emission (ASE) loading for select channels in the C-Band via a first ASE noise source coupled to a multiplexer for the C-Band,
      bulk ASE loading over the L-Band via a second ASE noise source coupled to an L-Band output, and
      an upgrade port for connection to an L-Band upgrade module, and
   wherein to upgrade from the initial deployment configuration:
      the L-Band upgrade module is connected to the upgrade port,
      the bulk ASE loading is turned down as L-Band channelized ASE loading is added via a third ASE noise source, and one or more L-Band channels are added as corresponding L-Band channelized ASE loading is turned down.

2. The optical node of claim 1, further comprising:
the L-Band upgrade module which includes L-Band channelized ASE loading and a plurality of ports, wherein the L-band upgrade module selectively connects to the upgrade port to provide an L-Band upgrade configuration, wherein, from the initial deployment configuration to the L-Band upgrade configuration, the L-Band upgrade module and the modular base module coordinate transition of the bulk ASE loading to the L-Band channelized ASE loading via a third ASE noise source.

3. The optical node of claim 2, wherein the transition includes the bulk ASE loading being turned down while the L-Band channelized ASE loading is turned up.

4. The optical node of claim 1, wherein, in the initial deployment configuration, both the C-Band and the L-Band are noise loaded without requiring channel components for the L-Band.

5. The optical node of claim 1, wherein the L-Band upgrade module is a pluggable module that is selectively insertable in the modular base module for L-Band upgrade configuration.

6. The optical node of claim 1, wherein the one or more C+L-Band amplifier modules include Raman amplifiers, and wherein, in the initial deployment configuration, Raman gain of the Raman amplifiers is calibrated for both the C-Band and the L-Band.

7. The optical node of claim 1, wherein the first ASE noise source and the second ASE noise source each include a flattened Erbium Doped Fiber Amplifier (EDFA) with no input and each are disposed in the modular base module.

8. The optical node of claim 1, wherein the channelized ASE loading is performed based on channel monitoring and by coupling a portion of the first ASE source based thereon and the bulk ASE loading is provided at a single interface.

9. An optical system supporting a modular deployment and upgrade of optical spectrum, the optical system comprising:
C-Band ingress ports;
a C-Band demultiplexer and a C-Band multiplexer coupled to the C-Band ingress ports;
a C-Band egress port coupled to the C-Band demultiplexer and the C-Band multiplexer;
a first Amplified Spontaneous Emission (ASE) source coupled to the C-Band multiplexer and configured to provide channelized ASE loading for one or more C-Band channels via the C-Band multiplexer;
an upgrade port and an L-Band egress port;
a second ASE source coupled between the L-Band egress port and the upgrade port and configured to provide bulk ASE loading for all of the L-Band; and
an L-Band upgrade module including:
L-Band ingress ports;
an L-Band demultiplexer and an L-Band multiplexer coupled to the L-Band ingress ports;
an L-Band egress port coupled to the L-Band demultiplexer and the L-Band multiplexer, and the L-Band egress port further selectively coupled to the upgrade port; and
a third ASE source coupled to the L-Band multiplexer and configured to provide L-Band channelized ASE loading via the L-Band multiplexer, wherein the second ASE source and the third ASE source perform a coordinated handoff to switch from the bulk ASE loading to the L-Band channelized ASE loading.

10. The optical system of claim 9, further comprising:
one or more C+L-Band amplifier modules, wherein the one or more C+L-Band amplifier modules include Raman amplifiers, and wherein, in an initial deployment configuration, Raman gain of the Raman amplifiers is calibrated for both the C-Band and the L-Band.

11. The optical system of claim 9, wherein the second ASE source provides noise loading of the L-Band without requiring channel components for the L-Band.

12. The optical system of claim 9, wherein:
in an initial deployment configuration, the second ASE source provides the bulk ASE loading without the L-Band upgrade module equipped, and
in a transition to an L-Band upgrade, the L-Band upgrade module is equipped, and the bulk ASE loading is turned down as the L-Band channelized ASE loading is added.

13. The optical system of claim 9, wherein the first ASE source, the second ASE source, and the third ASE source each include a flattened Erbium Doped Fiber Amplifier (EDFA) with no input and each are disposed in the modular base module.

14. The optical system of claim 9, wherein the channelized ASE loading and the L-Band channelized ASE is performed based on channel monitoring and by coupling a portion of the respective ASE source based thereon and the bulk ASE loading is provided at a single interface.

15. The optical system of claim 9, wherein:
the C-Band ingress ports, the C-Band demultiplexer, the C-Band multiplexer, the first ASE source, the upgrade port, the L-Band egress port, and the second ASE source are associated with a base module, and
the L-Band ingress ports, the L-Band demultiplexer, the L-Band multiplexer, the L-Band egress port, and the third ASE source are associated with an upgrade module.

16. An optical node supporting a modular deployment and upgrade of optical spectrum, the optical node comprising:
one or more C+L-Band amplifier modules; and
a modular base module including a plurality of ports and which is configured to interface one or more C-Band optical modems;
wherein, in an initial deployment configuration, the modular base module includes
channelized Amplified Spontaneous Emission (ASE) loading for select channels in the C-Band via a first ASE noise source coupled to a multiplexer for the C-Band,
bulk ASE loading over the L-Band via a second ASE noise source coupled to an L-Band output, and
an upgrade port for connection to an L-Band upgrade module,
wherein the L-Band upgrade module selectively connects to the upgrade port to provide an L-Band upgrade configuration, wherein, from the initial deployment configuration to the L-Band upgrade configuration, the L-Band upgrade module and the modular base module coordinate transition of the bulk ASE loading to the L-Band channelized ASE loading via a third ASE noise source, wherein the transition includes the bulk ASE loading being turned down while the L-Band channelized ASE loading is turned up.

17. The optical node of claim 16, wherein, in the initial deployment configuration, both the C-Band and the L-Band are noise loaded without requiring channel components for the L-Band.

18. The optical node of claim 16, wherein the L-Band upgrade module is a pluggable module that is selectively insertable in the modular base module for L-Band upgrade configuration.

19. The optical node of claim 16, wherein the one or more C+L-Band amplifier modules include Raman amplifiers, and wherein, in the initial deployment configuration, Raman gain of the Raman amplifiers is calibrated for both the C-Band and the L-Band.

20. The optical node of claim 16, wherein the first ASE noise source and the second ASE noise source each include a flattened Erbium Doped Fiber Amplifier (EDFA) with no input and each are disposed in the modular base module.

* * * * *